(12) United States Patent
Agur et al.

(10) Patent No.: US 6,355,194 B1
(45) Date of Patent: Mar. 12, 2002

(54) CARRIER PELLETIZING PROCESSES (75) Inventors: Enno E. Agur, Toronto; Hadi K. Mahabadi, Etobicoke; Sheau V. Kao, Burlington; Gerald R. Allison, Oakville, all of (CA); John A. Creatura, Ontario, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/274,132

(22) Filed: Mar. 22, 1999

(51) Int. Cl.[7] ............................ B29C 47/00; G03G 9/107
(52) U.S. Cl. ............... 264/142; 430/106.2; 430/106.3; 430/108.01; 430/109.4
(58) Field of Search ................................ 264/140–142, 264/146; 425/294; 430/106.3, 106.2, 109.4, 108.1

(56) References Cited

U.S. PATENT DOCUMENTS

| 3,533,835 | A | * | 10/1970 | Hagenbach et al. | |
|---|---|---|---|---|---|
| 3,658,500 | A | * | 4/1972 | Hagenbach | |
| 3,798,167 | A | * | 3/1974 | Kukla et al. | |
| 3,918,968 | A | * | 11/1975 | Kukla | |
| 3,922,382 | A | * | 11/1975 | Kukla et al. | |
| 3,939,086 | A | * | 2/1976 | Hagenbach | |
| 4,233,387 | A | | 11/1980 | Mammino et al. | 430/137 |
| 4,238,558 | A | * | 12/1980 | Ziolo | |
| 4,264,697 | A | * | 4/1981 | Perez et al. | |
| 4,292,387 | A | | 9/1981 | Kanbe et al. | 430/102 |
| 4,310,611 | A | * | 1/1982 | Miskins | |
| 4,426,433 | A | | 1/1984 | Kohri et al. | 430/109 |
| 4,565,765 | A | | 1/1986 | Knapp et al. | 430/122 |
| 4,810,611 | A | * | 3/1989 | Ziolo et al. | |
| 4,879,198 | A | * | 11/1989 | Tavernier et al. | |
| 4,935,326 | A | | 6/1990 | Creatura et al. | 430/108 |
| 4,937,166 | A | * | 6/1990 | Creature et al. | |
| 5,106,714 | A | * | 4/1992 | Saha et al. | |
| 5,409,791 | A | | 4/1995 | Kaukeinen et al. | 430/54 |
| 5,576,133 | A | * | 11/1996 | Baba et al. | |
| 5,607,805 | A | * | 3/1997 | Semura et al. | |
| 5,624,778 | A | * | 4/1997 | Sato et al. | |
| 5,629,119 | A | | 5/1997 | Inoue et al. | 430/106.6 |
| 5,663,027 | A | | 9/1997 | Kohri et al. | 430/106.6 |
| 5,826,151 | A | | 10/1998 | Genoveae | 399/277 |
| 6,099,999 | A | * | 8/2000 | Takenaka et al. | |

* cited by examiner

Primary Examiner—Mark Eashoo
(74) Attorney, Agent, or Firm—E. O. Palazzo (57) ABSTRACT

A process for the preparation of microsynthetic carrier comprising the melting of a mixture of binder resin, magnetic component, colorant and optionally charge control additive, thereby forming a polymer melt, and mixing said mixture in a melt mixing device, cooling and pelletizing said mixture, and thereafter grinding and classifying said pellets.

41 Claims, 3 Drawing Sheets

CARRIER PELLETIZING PROCESSES

BACKGROUND OF THE INVENTION

This invention is generally directed to carrier and developer compositions thereof, and more specifically, the present invention relates to developer compositions with synthetic carrier components, and yet more specifically, the present invention relates to melt mixing processes for the high solids content microsynthetic carrier wherein the solids content is in the range amount of from about 60 to about 90 percent by weight of carrier, and wherein the term "micro" of "microsynthetic" refers, for example, to a synthetic carrier particle size in the range of from about 20 to about 100 microns, and more specifically, from about 25 to about 80 microns in diameter, and preferably from about 30 to about 60 microns in diameter.

In embodiments of the present invention, the synthetic carrier particles are generally comprised of binder polymer, magnetic component, colorant, and optionally charge control additives. The carriers, which can be prepared by extrusion melt mixing, pelletizing, grinding and classification, can be selected for a number of different xerographic systems, such as copiers and printers like high speed color xerographic copies, digital copiers, multi copier/printers, and more specifically, wherein colored copies with excellent and substantially no background deposits are achievable. Developer compositions comprised of the carrier particles illustrated herein are generally useful in electrostatographic or electrophotographic imaging systems, especially xerographic imaging and printing processes, and digital processes. Additionally, the invention developer compositions can be selected for a number of imaging processes such as noninteractive development systems, reference U.S. Pat. Nos. 4,292,387; 5,409,791 and 5,826,151, the disclosures of which are totally incorporated herein by reference.

PRIOR ART

The electrostatographic process, and particularly the xerographic process, is well known. This process involves the formation of an electrostatic latent image on a photoreceptor, followed by development, and subsequent transfer of the image to a suitable substrate. Numerous different types of xerographic imaging processes are known wherein, for example, insulative developer particles or conductive toner compositions are selected depending on the development systems used. Moreover, of importance with respect to the aforementioned developer compositions are the appropriate triboelectric charging values associated therewith.

Certain synthetic carriers are known, for example U.S. Pat. No. 4,426,433, which discloses a carrier with a binder and a powder of a magnetizable material dispersed therein, and carbon black. The resin binder includes styrene butadiene polymers, and the magnetite can be MAPICO BLACK™. Also, U.S. Pat. No. 5,663,027 discloses a carrier of a binder resin, such as a polyester, or a styrene/acrylic copolymer, and a magnetite such as $FeO.Fe_2O_3$. In U.S. Pat. No. 4,565,765, there is illustrated a carrier composition comprised of a resin binder of for example, polyamides, epoxies, polyurethanes, polyesters, styrene acrylates, and magnetites like MAPICO BLACKS™ Carbon black can also be included in the carrier according to the disclosure of U.S. Pat. No. 4,565,765. Moreover, in U.S. Pat. No. 5,629,119 there is disclosed melt kneading processes for the preparation of a two component binder type magnetic carrier comprised of a magnetic powder and a binder resin wherein the carrier selected contains dispersed therein a release agent.

Nonsynthetic carriers are disclosed, for example, in U.S. Pat. No. 3,590,000. These carrier particles can contain various cores, including steel, with a coating thereover of fluoropolymers, and terpolymers of styrene, methacrylate, and silane compounds. A number of these coatings can deteriorate rapidly, especially when selected for a continuous xerographic process where part of, or the entire coating may separate from the carrier core in the form of chips or flakes, and fail upon impact, or abrasive contact with machine parts and other carrier particles. These flakes or chips, which cannot generally be reclaimed from the developer mixture, usually adversely effect the triboelectric charging characteristics of the carrier particles thereby providing images with lower resolution in comparison to those compositions wherein the carrier coatings are retained on the surface of the core substrate. Further, another problem encountered with some prior art carrier coatings resides in fluctuating triboelectric charging characteristics, particularly with changes in relative humidity, and relatively low tribo as compared to the high tribo carriers of the present invention.

There are illustrated in U.S. Pat. No. 4,233,387, the disclosure of which is totally incorporated herein by reference, coated carrier components for electrostatographic developer mixtures comprised of finely divided toner particles clinging to the surface of the carrier particles. Specifically, there is disclosed in this patent coated carrier particles obtained by mixing carrier core particles of an average diameter of from between about 30 microns to about 1,000 microns with from about 0.05 percent to about 3.0 percent by weight, based on the weight of the coated carrier particles, of thermoplastic or thermosetting resin particles. The resulting mixture is then dry blended until the resin particles adhere to the carrier core by mechanical impaction, and/or electrostatic attraction. Thereafter, the mixture is heated to a temperature of from about 320° F. to about 650° F. for a period of 20 minutes to about 120 minutes, enabling the resin particles to melt and fuse on the carrier core.

There is illustrated in U.S. Pat. Nos. 4,937,166 and 4,935,326, the disclosures of which are totally incorporated herein by reference, carrier containing a mixture of polymers, such as two polymers, not in close proximity in the triboelectric series. Moreover, in U.S. Pat. No. 4,810,611, the disclosure of which is totally incorporated herein by reference, there is disclosed the addition to carrier coatings of colorless conductive metal halides in an amount of from about 25 to about 75 weight percent, such halides including copper iodide, copper fluoride, and mixtures thereof.

There are disclosed in U.S. Pat. No. 4,565,765 processes for the preparation of synthetic carriers containing a MAPICO BLACK™ magnetite up to 60 percent by weight of carrier, and VULCAN XC72R™ carbon black up to 8 percent by weight of carrier. The compositions can be ground in a Fitzmill and screened to an average particle size of about 75 microns. The MAPICO BLACK™ magnetite disclosed in U.S. Pat. No. 4,565,765 has a coercivity less than 200 gauss, and therefore is considered soft magnetic. To prepare a hard magnetic carrier, there is selected a hard magnetic powder such as, for example, strontium ferrite which is more insulative than MAPICO BLACK™ magnetite. The induced magnetic moment of a synthetic carrier in an applied magnetic field is a function of the concentration of magnetic material in the carrier particle. It is, therefore, preferred to maximize the amount of magnetic material contained in the carrier particle. To minimize the effect of magnetic moment reduction by dilution of magnetic material in the carrier particle by the binder resin and carbon black, it is desirable to have a concentration of magnetic material greater than 50 percent by weight, that is, in the range from about 50 to about 85 percent by weight, and preferably in the range from about 60 to about 75 percent by weight of carrier.

Other U.S. patents that may be of interest include U.S. Pat. No. 3,939,086, which illustrates steel carrier beads with polyethylene coatings, see column U.S. Pat. No. 6; 4,264, 697, which discloses dry coating and fusing processes; U.S. Pat. Nos. 3,533,835; 3,658,500; 3,798,167; 3,918,968; 3,922,382; 4,238,558; 4,310,611; 4,397,935; and 4,434,220, the disclosures of each of these patents being totally incorporated herein by reference.

For specified interactive or noninteractive development systems, such as TurboMAZE, it is desirable for the carrier in the developer to possess hard magnetic characteristics. By hard magnetic is meant, for example, that the carrier has a magnetic coercivity greater than about 200 gauss, for example from about 300 to about 6,000 gauss as measured with a vibrating sample magnetometer. Hard magnetic refers, for example, generally to a material with permanent magnetic characteristics, that is the carrier possesses magnetic characteristics in the presence and in the absence of a magnet, and possesses a coercivity greater than about 200 gauss. Soft magnetic refers, for example, to a material that possesses magnetic characteristics in the present of a magnet and does not possess magnetic characteristics in the absence of a magnet.

In situations where a conductive carrier is preferred, it is desirable to have a conductive binder resin, that is, wherein the binder resin contains sufficient amounts of a conductive additive such as, for example, conductive carbon black to render the carrier particle conductive. By conductive, it is meant, for example, that the carrier has a conductivity greater than about $10^{-9}$ mho/cm. In U.S. Pat. No. 4,565,765, conductive carbon black concentrations of about 8 percent by weight of carrier are disclosed. Together with the MAPICO BLACK™ magnetite, this level of carbon black renders the carrier particle conductive. Strontium ferrite is more insulative than MAPICO BLACK™. Therefore, to attain similar levels of conductivity as in U.S. Pat. No. 4,565,765, significantly higher amounts of conductive carbon black need to be utilized, such as for example, in the range from about 10 to about 20 per cent by weight of carrier. Important to the conductivity is also how the carbon black is dispersed in the binder resin. If the carbon black is dispersed too finely, then the carrier conductivity will be lower than if the level of dispersion is more moderate. Processing conditions, for example melt mixing process, are needed to optimize the carbon black dispersion for maximized conductivity.

In addition to imparting conductivity to the carrier, the presence of carbon black in synthetic carrier particles can function to improve the adhesion between the binder resin and magnetic component. This is especially important for concentrations of magnetic component in excess of about 60 percent by weight of carrier. For the sole purpose of improving adhesion between the binder resin and magnetic powder, amounts of carbon black selected are in the range of from about 1 to about 20 percent by weight of carrier. When no carbon black is present, the carrier containing a high loading of magnetic component is very fragile in a developer housing. Furthermore, in the process of grinding of the synthetic carrier, excess amounts of fines would be produced, that is in excess of 50 percent by weight of material with particle size less than about 25 microns, rendering the process uneconomical.

For an insulative synthetic carrier, the desirable concentration of carbon black is in the range of from about 1 to about 20 percent by weight of carrier. The desirable concentration of carbon black for a conductive synthetic carrier is in the range of from about 10 to about 20 percent by weight of carrier. Therefore, the solids content (magnetic component and carbon black) of a hard magnetic synthetic carrier can range from about 60 to about 90 percent by weight of carrier, and wherein a very low amount of binder resin remains in the carrier to bind the carrier together, that is, for example from about 10 to about 40 percent by weight of carrier. At these low levels of binder resin, special precautions are needed to prevent undue wear in polymer melt mixing machinery, such as for example, downstream feeding of the magnetic powder in an extruder.

It is known that the addition of carbon black to a binder resin has the effect to reinforce the binder resin, that is, to increases the tensile strength, toughness and hardness of binder resin in addition to improving the adhesion between the binder resin and magnetic powder. For carbon black loading in excess of about 10 percent by weight, this increase is substantial which results in a decrease in the brittleness or grindability of the binder resin thereby render the processes for the preparation of small carriers difficult and uneconomical. In specified interactive or noninteractive development systems, such as TurboMAZE, smaller carrier particles are desired, such as for example those with a volume average diameter of from about 25 to about 100 microns, and preferably from about 30 to about 60 microns as measured with a Coulter Counter.

To generate smaller carrier particles with higher carbon black contents, a new grinding process is needed since fitzmilling alone will not suffice. Therefore, there is needed a process for the generation of high solids content, small size microsynthetic carriers where the process includes (i) melt mixing to enable the processing of high concentrations of solids (magnetic powder and carbon black), and (ii) grinding and classification for the generation of small size microsynthetic carrier particles in the size range of from about 25 and 100 microns, and preferably from about 30 to about 60 microns.

SUMMARY OF THE INVENTION

It is a feature of the present invention to provide toner and developer compositions with synthetic carrier particles.

In another feature of the present invention there are provided high solids content microsynthetic carriers wherein the solids content is in the range amount of from about 60 to about 90 percent by weight of carrier, and wherein the microsynthetic refers to synthetic particles having a size in the range of from about 25 to about 100 microns.

In a further feature of the present invention there are provided certain microsynthetic carriers that are especially useful in TurboMAZE development systems.

In yet a further feature of the present invention there are provided processes for generating high solids content microsynthetic carrier particles.

In yet another feature of the present invention there are provided melt mixing processes, batch or continuous, and grinding and classification processes for generating high solids content microsynthetic carrier particles.

In still yet another feature of the present invention there are provided extrusion melt mixing, mechanical impact grinding, fluid energy grinding, screening and air classifier processes for generating high solids content synthetic carrier particles.

In a further feature of the present invention there are provided high solids content synthetic carrier particles with magnetic characteristics.

In still a further feature of the present invention there are provided high solids content microsynthetic carrier particles with hard magnetic characteristics. By hard magnetic is meant, for example, that the particle has a magnetic coercivity of equal to or greater than about 200 gauss, for example from about 300 to about 6,000 gauss as measured with a vibrating sample magnetometer.

In yet a further feature of the present invention there are provided high solids content microsynthetic carrier particles with hard magnetic characteristics and substantially constant conductivity parameters.

In another feature of the present invention there are provided high solids content microsynthetic carrier particles with hard magnetic characteristics, substantially constant conductivity parameters, and a wide range of preselected triboelectric charging values.

In still another feature of the present invention there are provided high solids content microsynthetic carrier particles generated from a mixture of polymers that are not in close proximity in the tribo series, that is for example, a mixture of monomers from different positions in the triboelectric series, reference for example U.S. Pat. Nos. 4,937,166 and 4,935,326, the disclosures of which are totally incorporated herein by reference.

In still yet another feature of the present invention there are provided high solids content microsynthetic carrier particles with insulating characteristics, wherein the conductivity ranges from about $10^{-9}$ to about $10^{-17}$ mho/cm, and which solids are comprised of a resin binder, a hard magnetic component and a colorant dispersed therein.

In a further feature of the present invention there are provided high solids content microsynthetic carrier particles with insulating characteristics, and which carriers are comprised of a resin binder, a hard magnetic component and a colorant dispersed therein, wherein the hard magnetic component is for example a metal or metal oxide and the colorant is for example a carbon black.

In still a further feature of the present invention there are provided high solids content microsynthetic carrier particles with conducting characteristics wherein the conductivity of the carrier particles are from about $10^{-4}$ to about $10^{-9}$ mho/cm, and which particles are comprised of a conductive resin binder and a hard magnetic component dispersed therein.

Moreover, in another feature of the present invention there are provided high solids content microsynthetic carrier particles with conducting characteristics comprised of a conductive resin binder and a hard magnetic component dispersed therein, wherein the conductive resin binder contains a conductive colorant, such as for example a conductive carbon black, and the hard magnetic component is, for example, a metal or metal oxide.

In still yet a further feature of the present invention there are provided high solids content microsynthetic carrier particles comprised of a resin binder, a hard magnetic component and a colorant dispersed therein and wherein the resin binder is comprised of a mixture of polymers and wherein the carrier triboelectric charging values are from about −80 to about 80 microcoulombs per gram at the same coating weight as determined by the known Tilt-A-Whirl technique, reference U.S. Pat. No. 4,546,060, the disclosure of which is totally incorporated herein by reference. The Tilt-A-Whirl is a completely automated triboelectric charge measurement device for use with xerographic developers containing permanently magnetized carrier. A circular multi-pole magnet containing 8 alternating north-south poles (4 pole pairs) spins at 1,000 revolutions per minute (roughly 130 pole transitions per second) to provide magnetic agitation to a bed of developer. The bed of developer, that is toner and carrier (0.1 gram), rests on a donor plate biased at either +1000 volts or −1000 volts. The combination of the magnetic agitation and electrical bias on the donor plate propels the charged toner to a grounded receiver plate spaced 1 cm from the donor plate. A 1,000 volt bias over a 1 centimeter gap provides a development field of 0.1 volts/micron. The receiver plate is weighed before and after a 10 minute development run, and the charge accumulated on the receiver plate is measured with an electrometer and recorded every second by the computer controlling the measurement. Accumulated charge as a function of time and final charge divided by final mass, that is, triboelectric charge, are outputs from the measurement.

Also, in another feature of the present invention there are provided positively charged toner compositions, or negatively charged toner compositions having incorporated therein high solids content microsynthetic carrier particles containing a mixture of binder polymers, and preferably a mixture of two binder polymers.

Aspects of the present invention relate to a process for the preparation of carrier comprising the melting of a mixture of binder resin, magnetic component, and colorant, thereby forming a polymer melt, and mixing the mixture in a melt mixing device, cooling and pelletizing the mixture, and thereafter grinding and classifying the pellets; a process wherein the melting is accomplished by heating at a temperature of from about 40° C. to about 300° C., and cooling is from about 25° C. to about 95° C.; a process wherein the melt mixing is accomplished in a batch melt mixing device, in a continuous melt mixing device, or in an extruder; a process wherein the pelletizing is accomplished in a pelletizer; a process wherein the pelletizing is accomplished in a rotating blade pelletizer, or in a mechanical impact grinder; a process wherein the grinding is accomplished in a Fitzmill; a process wherein the grinding is accomplished in a fluid energy mill, or in a micronizer; a process wherein the classification is accomplished in a screening device; a process wherein the classification is accomplished in an air classifier; a process comprising (i) first melting the binder resin and colorant, thereby forming a polymer melt;
(ii) introducing the magnetic component into the polymer melt;
(iii) providing sufficiently high shear to disperse the colorant, and magnetic component in the polymer melt, and wherein shear rate is in the range of from about 50 to about 500 revolutions per minute; pelletizing;
(iv) cooling the polymer melt;

(v) grinding; and
(vi) classification; and wherein microsynthetic carrier possesses a size of from about 25 to about 80 microns, and the colorant is present in an amount of at least about 10 percent by weight; a process comprising
(i) preblending and feeding, or separately feeding, the binder resin and colorant to an continuous melt mixing apparatus at an upstream location;
(ii) melting the mixture of binder resin and colorant, thereby forming a polymer melt;
(iii) feeding the magnetic component to the melt mixing aparatus at a downstream location;
(iv) providing sufficiently high shear to disperse the colorant and magnetic component in the polymer melt by controlling the melt temperature in the melt mixing apparatus;
(v) pumping the polymer melt through a die;
(vi) cooling the extrudate;
(vii) pelletizing;
(viii) grinding the pellets to an intermediate volume average diameter in the range of from about 100 to about 500 microns in a mechanical impact mill;
(ix) further grinding the particles to a volume average diameter in the range of from about 20 to about 100 microns in a fluid energy mill; and
(x) classifying the particles in a screening device, and optionally in an air classifier; and wherein microsynthetic carrier possesses a size of from about 25 to about 80 microns, and the colorant is present in an amount of at least about 10 percent by weight; a process further comprising heating the polymer melt to a temperature of from about 40° C. to about 300° C., and controlling the temperature of the polymer melt during melt mixing; a process wherein the grinding is accomplished in a Fitzmill utilizing a 850 micron screen, and the rotor speed in the Fitzmill is in the range of from about 1,000 to about 3,000 revolutions per minute; a process wherein the grinding is accomplished in an about 8 inch micronizer, and the feed rate in the micronizer is in the range of from about 3 to about 8 pounds per hour, and the air pressure in the micronizer is in the range of from about 40 to about 80 pounds per square inch; a process wherein the grinding is accomplished in an about 8 inch micronizer, and the feed rate in the micronizer is in the range of from about 4.5 to about 6 pounds per hour, and air pressure in the micronizer is in the range of from about 50 to about 70 pounds per square inch; a process wherein the classification is accomplished in a screening device to obtain a carrier particle volume average diameter in the range of from about 40 to about 100 microns, and further comprising
(i) screening the micronized particles through a 75 micron sieve in the screening device;
(ii) screening the fines fraction of the screened particles through a 38, 45 or 53 micron sieve in the screening device; and
(iii) retaining the coarse fraction of the screened particles with a volume average diameter in the range of from about 38 to about 75 microns, about 45 to about 75 microns, or about 53 to about 75 microns, respectively, as carrier product; a process wherein the classification is accomplished in a screening device and an air classifier to generate particles with a volume average diameter in the range of from about 25 to about 50 microns, and further comprising
(i) screening the micronized particles through a 38 or a 45 micron sieve in the screening device;
(ii) feeding the fines fraction of the screened particles to the air classifier, and wherein the rotor speed of the air classifier is in the range of from about 700 to about 1,500 revolutions per minute; and
(iii) retaining the coarse fraction of the classified particles with a volume average diameter in the range of from about 25 to about 50 microns as carrier product; a process wherein the binder resin is a polyamide, an epoxy, a polyurethane, a silicone polymer, a diolefin, a vinyl resin, a styrene acrylate, a styrene methacrylate, a styrene butadiene, or a polyester; a process wherein the polyester is the polymeric esterification product of a dicarboxylic acid and a diol comprising a diphenol, and wherein specific vinyl monomer is styrene, p-chlorostyrene, vinyl naphthalene, unsaturated monoolefins ethylene, propylene, butylene, or isobutylene; vinyl halides vinyl chloride, vinyl bromide, or vinyl fluoride; vinyl esters vinyl acetate, vinyl propionate, vinyl benzoate or vinyl butyrate; vinyl ethers of vinyl methyl ether, vinyl isobutyl ether or vinyl ethyl ether; vinyl ketones of vinyl methyl ketone, vinyl hexyl ketone or methyl isopropenyl ketone; monocarboxylic acids of acrylic acid, methyl acrylate, ethyl acrylate, n-butyl acrylate, isobutyl acrylate, dodecyl acrylate, n-octyl acrylate, 2-chloroethyl acrylate, phenyl acrylate, methylalphachloracrylate, methacrylic acids, methyl methacrylate, ethyl methacrylate, butyl methacrylate, octyl methacrylate, acrylonitrile, methacrylonitrile, acrylamide or trifluoroethyl methacrylate; dicarboxylic acids with a double bond and their derivatives of maleic acid, monobutyl maleate, dibutyl maleate, unsaturated monooletins of ethylene, propylene, butylene or isobutylene; vinylidene halides of vinylidene chloride or vinylidene chlorofluoride; N-vinyl compounds of N-vinyl indole or N-vinyl pyrrolidene; fluorinated monomers of pentafluoro styrene, allyl pentafluorobenzene or mixtures thereof, and where the amount of the binder resin is from about 10 to about 50 percent by weight of the carrier; a process wherein the binder resin is polymethyl methacrylate, polystyrene n-butyl methacrylate copolymer, polymethyl/n-butyl methacrylate copolymer, or mixtures thereof, and where the amount of the binder resin is from about 10 to about 50 percent by weight of the carrier; a process wherein the magnetic component is selected from the group consisting of metals, metal oxides, and mixtures thereof, and where the amount of the magnetic component is from about 50 to about 85 percent by weight of the carrier; a process wherein the magnetic component is a hard magnetic component selected from the group consisting of metals, metal oxides, and mixtures thereof, and where the amount of the hard magnetic component is from about 60 to about 75 percent by weight of the carrier; a process wherein the magnetic component is a ferrite, and where the amount of the ferrite is from about 50 to about 85 percent by weight of the carrier; a process wherein the magnetic component is strontium ferrite, and where the amount of the strontium ferrite is from about 50 to about 85 percent by weight of the carrier; a process wherein the colorant is selected from the group consisting of carbon blacks, metals, metal oxides, and mixtures thereof, and where the amount of the colorant is from about 1 to about 40 percent by weight of the carrier; a process wherein the colorant is carbon black, and where the amount of the carbon black is from about 10 to about 20 percent by weight of the carrier; a process wherein there is added to the melt a charge control additive selected from the group consisting of quaternary ammonium salts, and where the amount of the quaternary ammonium salts is from about 0.05 to about 15 percent by weight of the carrier; a process wherein the carriers produced by the process are composite particles comprising binder resin, magnetic component, and colorant, wherein the binder resin is present in an amount of from about 10 percent to about 50 percent by weight of the carrier, wherein the magnetic component is present in an amount of from about 50 percent to about 85 percent by weight of the carrier, wherein the colorant is present in an amount of from about 1 percent to about 40 percent by weight of the carrier, and wherein the melt optionally includes charge control additive present in an amount of from about 0.05 percent to about 15 percent by weight of the carrier; a process wherein the carriers produced by the process are composite particles comprising binder resin, magnetic component, and colorant, and wherein the binder resin is present in an amount of from about 15 percent to about 30 percent by weight of the carrier, wherein the magnetic component is present in an amount of from about 60 percent to about 75 percent by weight of the carrier, and wherein the colorant is present in an amount of from about 4 percent to about 20 percent by weight of the carrier; a process wherein the carrier produced by the process has a volume average diameter of from about 25 to about 500 microns; a process wherein the carrier produced by the process has a volume average diameter of from about 25 to about 100 microns; a process wherein the carrier produced by the process has a volume average diameter of from about 30 to about 60 microns; a process wherein the carrier produced by the process has a triboelectric charge value of from about −80 to about 80 microcoulombs/gram; a process wherein the carrier produced by the process has a conductivity of from about $10^{-17}$ to about $10^{-4}$ mho/cm; a process wherein the carrier produced by the process has a triboelectric charge value of from about −60 to about 60 microcoulombs/gram and a conductivity of from about $10^{-15}$ to about $10^{-6}$ mho/cm; a process wherein the carrier produced by the process has a magnetic coercivity of from about 300 to about 6,000 gauss; a process wherein the carrier produced by the process has an induced magnetic moment of from about 20 to about 100 EMU/g in an applied field of about 1,000 gauss; a process wherein the carrier produced by the process has a magnetic coercivity of from about 1,000 to about 3,000 gauss, and an induced magnetic moment of from about 20 to about 60 EMU/g in an applied field of about 1,000 gauss; a process for the preparation of microsynthetic carrier with a high solids content comprising the melting of a mixture of binder resin, magnetic component, and colorant; subsequently adding the mixture to a melt mixing device; cooling and pelletizing the mixture, and thereafter grinding and classifying the pellets; and wherein microsynthetic carrier possesses a size of from about 25 to about 80 microns, and the colorant is present in an amount of at least about 10 percent by weight; a process wherein there is formed, subsequent to the melting of the mixture, a polymer melt comprised of a mixture of binder resin present in an amount of from about 10 to about 50 percent by weight of the mixture, magnetic component present in an amount of from about 50 to about 85 percent by weight of the mixture, colorant present in an amount of from about 1 to about 40 percent by weight of the mixture, wherein the mixing is accomplished at a temperature in the range of from about 40° C. to about 300° C.; wherein the mixture is cooled to from about 25° C. to about 95° C.; wherein the mixture is pelletized in a rotating blade pelletizer to a size in the range of from about 1 to about 10 millimeters; and wherein the grinding and classifying are accomplished in a mechanical impact mill followed by a fluid energy and classifier to reduce the pellets size to a volume average diameter in the range from about 25 to about 100 microns; a process wherein the polymer melt is comprised of a mixture of binder resin comprising polymethyl methacrylate, polystyrene n-butyl methacrylate copolymer, polymethyl/n-butyl methacrylate copolymer, or mixtures thereof in an amount of from about 15 to about 30 percent by weight of the mixture, strontium ferrite in an amount of from about 60 to about 75 percent by weight of the mixture, carbon black in the amount of from about 10 to about 20 percent by weight of the mixture, wherein the mixing is accomplished in an extruder at a temperature in the range of from the melting temperature of the binder resin to about 150° C. above the melting temperature of the binder resin; wherein the mixture is cooled to from about 25° C. to about 95° C.; wherein the mixture is pelletized in a rotating blade pelletizer to a size of from about 1 to about 10 millimeters; wherein the grinding is accomplished in a Fitzmill utilizing a 850 micron screen and operating with a rotor speed of from about 1,000 to about 3,000 revolutions per minute to obtain a particle volume average diameter in the range of from about 100 to about 500 microns; wherein subsequent grinding is accomplished in an 8 inch micronizer operating at a feed rate in the range of from about 4.5 to about 6 pounds per hour and air pressure in the range of from about 50 to about 70 pounds per square inch to reduce the particle size to a volume average diameter in the range of from about 20 to about 100 microns; and wherein the classifying is accomplished in a screening device utilizing screens with mesh sizes in the range of from about 38 to about 75 microns to obtain microsynthetic carrier with volume average diameter of from about 40 to about 60 microns; a process wherein the polymer melt is comprised of a mixture of binder resin comprised of polymethyl methacrylate, polystyrene n-butyl methacrylate copolymer, or polymethyl/n-butyl methacrylate copolymer, or a mixture thereof in the range from about 15 to about 30 percent by weight of the mixture, strontium ferrite in the range from about 60 to about 75 percent by weight of the mixture, carbon black in the range from about 10 to about 20 percent by weight of the mixture, and optionally charge control additive in the range from about 0.1 to about 3 percent by weight of the mixture; wherein the mixing is carried out in an extruder at a temperature in the range of from the melting temperature of the binder resin to about 150° C. above the melting temperature of the binder resin; wherein the mixture is cooled to below the melting temperature of the binder resin, and preferably in the range of from about 25 to about 95° C.; wherein the mixture is pelletized in a rotating blade pelletizer to a size in the range of from about 1 to about 10 millimeters; wherein the grinding is carried out in a Fitzmill utilizing a 850 micron screen and operating with a rotor speed in the range of from about 1,000 to about 3,000 revolutions per minute to obtain a particle volume average diameter in the range of from about 100 to about 500 microns; wherein subsequent grinding is carried out in an 8 inch micronizer operating at a feed rate in the range of from about 4.5 to about 6 pounds per hour and air pressure in the range of from about 50 to about 70 pounds per square inch to reduce the particle size to a volume average diameter in the range of from about 20 to about 100 microns; and wherein the classifying is accomplished in a screening device utilizing screens having mesh sizes in the range of from about 38 to about 45 microns and air classifier operating with a rotor speed in the range of from about 700 to about 1,500 revolutions per minute to obtain microsynthetic carrier with volume average diameter in the range of from about 25 to about 45 microns; developer compositions comprised of toner and high solids content microsynthetic carrier particles wherein the solids content is in the range amount of from about 60 to about 90 percent by weight of carrier and wherein the term microsynthetic particle refers, for example, to synthetic particles having a size in the range of from about 25 to about 100 microns as measured with a Coulter Counter. More specifically, the microsynthetic carrier particles are comprised of a resin binder comprised of a single polymer or mixture thereof, for example from about 2 to about 10 polymers, magnetic components, and more specifically hard magnetic components such as metal or metal oxides, colorants such as carbon black, and optionally charge control additives, and which carrier particles are of a volume average diameter of for example from about 25 to about 100 microns, and preferably from about 30 to about 60 microns. The carrier particles can be prepared by melt mixing in a batch or continuous melt mixing device wherein there is mixed a resin binder comprised of a polymer or a mixture of polymers, magnetic component, colorant, and optionally charge control additives under high temperature conditions, that is, from about 40° C. to about 300° C., and preferably from the melting temperature of the binder resin to about 150° C. above the melting temperature of the binder resin; cooling; grinding; and classification. In preferred embodiments of this process, the binder resin, colorant and optional charge control additive are preblended and fed, or fed separately, to a melt mixing device such as an extruder at an upstream location and the magnetic component is fed at a downstream location to minimize undue screw abrasion by the magnetic powder in the upstream screw channel before the polymer is melted. The binder resin is melted and the mixture is melt mixed from about 40° C. to about 300° C., and preferably from the melting temperature of the binder resin to about 150° C. above the melting temperature of the binder resin, in the extruder screw channel wherein the selection of extruder screw configuration, length, temperature and screw speed enables dispersion of the magnetic component, colorant and optional charge control additive in the binder resin. Temperature control enables the melt mixing to be accomplished in a controlled and reproducible fashion. Extruder screw configuration and length can also provide high shear conditions to distribute and disperse the magnetic component, colorant and optionally charge control additive in the polymer melt. The polymer melt containing the mixture is then pumped through a die, cooled to below the softening temperature of the polymer with water or air, and pelletized in a pelletizer, such as for example a water bath pelletizer, underwater pelletizer, mist water granulator and the like, to a size in the range of from about 1 to about 10 millimeters. The resulting pellets are then fed to a mechanical impact mill such as a Fitzmill wherein the selection of screen size and blade speed enables the pellets to be ground to an intermediate average particle size, nominally in the range of from about 100 to about 500 microns. The ground particles are then fed to a fluid energy mill such as a micronizer wherein the selection of feed rate in the range of, for example, from about 3 to about 8 pounds per hour in a 8 inch Sturtevant micronizer and air pressure in the range from about 40 to about 80 pounds per square inch enables the particles to be further ground to an volume average diameter in the range of from about 20 to about 100 microns as measured with a Coulter Counter. Depending on the required final average particle size, one or more different classification processes can be selected to reduce the particle size distribution. For volume average diameters in the size range of from about 40 to about 100 microns, and preferably from about 40 to about 60 microns, it is advantageous and sufficient to utilize screening devices such as an Alpine Air Jet sieve utilizing screen sizes from about 38 to about 75 microns. For volume average diameters in the range of from about 25 to about 50 microns, and preferably from about 30 to about 45 microns, it is advantageous to first utilize screening devices such as an Alpine Air Jet sieve to remove the course particles greater than about 45 microns in size, and then to feed the remaining product through an air classifier, such as a Donaldson classifier, with a balance of particle inertial and air drag forces to reduce the particle size distribution. Also, it may be preferable to pass the carrier product resulting through the classifier several times, that is from about two to about six times, to obtain the desired average particle size and particle size distribution.

DETAILED DESCRIPTION OF PREFERRED EMBODIMENTS

The present invention relates to a process for fabricating high solids content carriers, wherein the solids content is, for example, from about 60 to about 90 percent by weight of carrier and wherein the carriers possess a size in the range of from about 25 to about 100 microns in volume average diameter as measured by a Coulter Counter, by melt mixing in any melt mixing device, batch or continuous, but preferably continuous such as, for example, an extruder binder resin, magnetic component, such as a metal or metal oxide such as ferrite, and preferably a hard magnetic metallic or metal oxide powder, such as strontium ferrite, a colorant, such as for example carbon black, and optionally a charge control additive, and which mixture is melt mixed at high temperature and under high shear conditions, followed by cooling, pelletizing, grinding and classification. By hard magnetic is meant, for example, that the carrier particle has a magnetic coercivity of equal to about or greater than about 200 gauss, for example from about 300 to about 6,000 or from about 500 to about 3,000 gauss as measured with a vibrating sample magnetometer.

Microsynthetic carriers of the present invention can be fabricated by a melt mixing process comprising the steps of: (1) melting a mixture of binder resin, colorant such as, for example, carbon black, and optionally charge control additive, thereby forming a polymer melt in the temperature range from about 40° C. to about 300° C., or more specifically from about 100 to about 175° C., and preferably from the melting temperature of the binder resin to about 150° C. above the melting temperature of the binder resin; (2) introducing a magnetic component such as, for example, a hard magnetic metal or metal oxide powder to the polymer melt; (3) providing shear to disperse the magnetic component, colorant and optionally charge control additive in the polymer melt; (4) cooling the polymer melt to below the melting temperature of the polymer; (5) grinding; and (6) classification. In a preferred embodiment, the process comprises the steps of (1) preblending and feeding, or separately feeding, the binder resin, colorant, such as for example carbon black, and optional charge control additive in an extruder at an upstream location; (2) melting the mixture of binder resin, colorant and optionally charge control additive, thereby forming a polymer melt; (3) feeding the magnetic component such as, for example, a hard magnetic metal or metal oxide powder to the extruder at a downstream location; (4) providing sufficiently high shear to disperse the magnetic component, colorant and optionally charge control additive in the polymer melt by controlling the melt temperature along the extruder channel at an appropriate level utilizing automatic barrel temperature controllers; (5) pumping the polymer melt through a die; (6) cooling the extrudate; (7) pelletizing the extrudate in a pelletizer to pellets in the size range of from about 1 to about 20, or from 2 to about 10 millimeters in size; (8) grinding the pellets in a mechanical impact mill to an intermediate size of from about 100 to about 500 microns; (9) further grinding in a fluid energy mill to a volume average diameter in the range of from about 20 to about 100 microns, and (10) classifying in a screening device, and optionally in an air classifier.

With the process of the present invention, the melt mixing may be accomplished in a melt mixing device such as an extruder as illustrated in U.S. Pat. No. 4,894,308, the disclosure of which is hereby totally incorporated herein by reference. Generally, any high shear, high temperature melt mixing device suitable for processing polymer melts may be employed. Examples of continuous melt mixing devices include single screw extruders, twin screw extruders, continuous internal mixers, gear extruders, disc extruders and roll mill extruders. Examples of batch internal melt mixing devices include Banbury mixers, Brabender mixers and Haake mixers.

One suitable type of extruder is the fully intermeshing corotating twin screw extruder such as, for example, the ZSK-30 twin screw extruder, available from Krupp Werner & Pfleiderer Corporation, Ramsey, N.J. U.S.A., which has a screw diameter of 30.7 millimeters and a length-to-diameter ratio (I/D) of 37.2. The extruder can melt the binder resin, provide high shear to disperse the magnetic component, colorant and optionally charge control additive in the binder resin melt, controls the melt temperature via appropriate temperature control along the extruder channel, and pumps the polymer melt through a die such as, for example, a strand die to a pelletizer.

Figure 1:
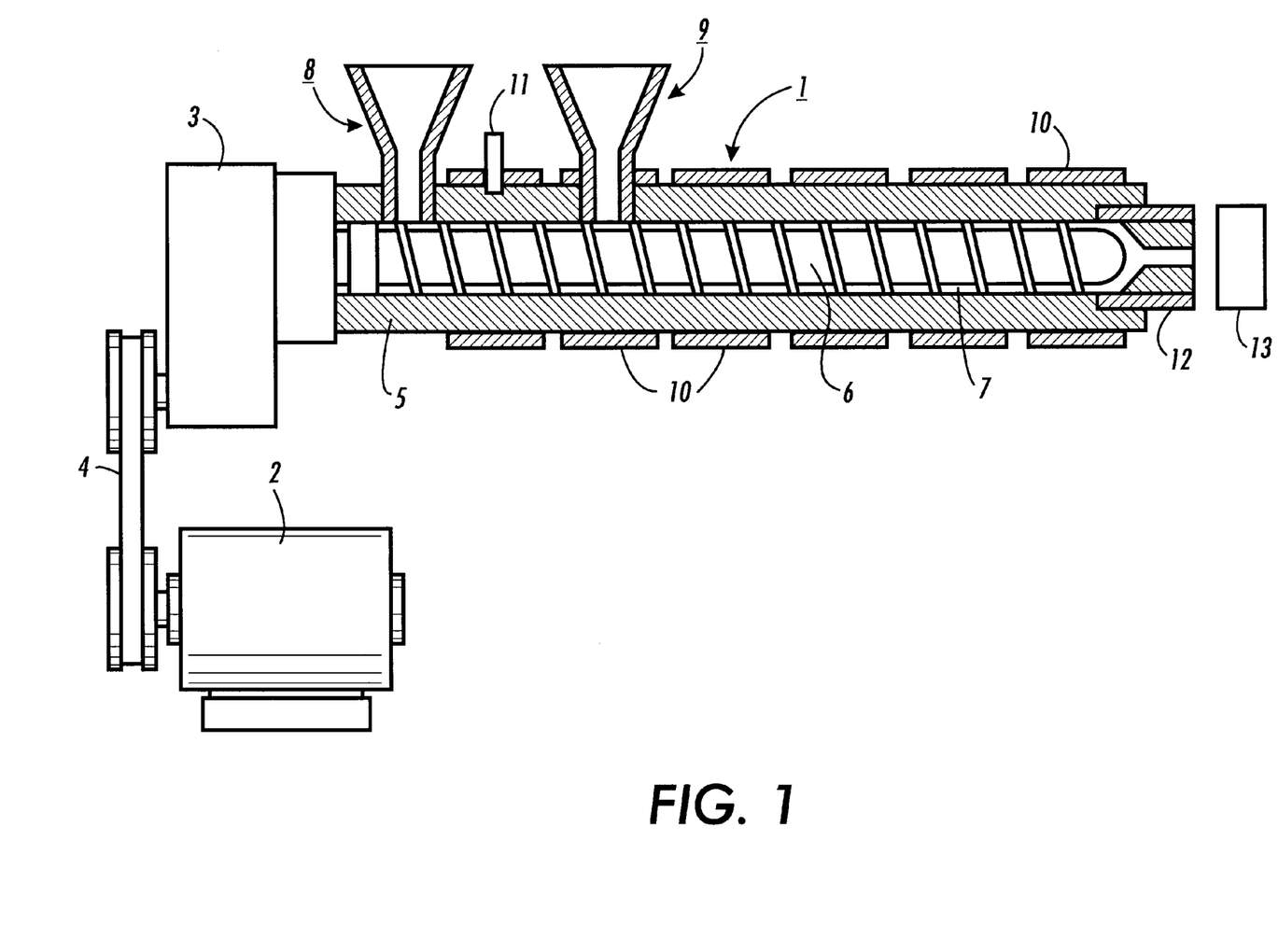
FIG. 1 is a partially schematic cross-sectional view of an extrusion melt mixing apparatus suitable for the process of the present invention.

For a better understanding of the present invention, a typical melt mixing extrusion apparatus suitable for the process of the present invention is illustrated in FIG. 1 depicting a twin screw extrusion device 1 containing a drive motor 2, a gear reducer 3, a drive belt 4, an extruder barrel 5, a screw 6, a screw extruder channel 7, an upstream supply port or hopper 8, a downstream port 9, a heater 10, a thermocouple 11, a die or head pressure generator 12, and a pelletizer 13. The barrel 5 consists of modular barrel sections, each separately heated with heater 10 and temperature controlled by thermocouple 11. With modular barrel sections, it is possible to locate feed ports at required locations, and provide segregated temperature control along the screw extruder channel 7. The screw 6 is also modular, enabling the screw to be configured with modular screw elements and kneading elements having the appropriate lengths, pitch angles, etc. in such a way as to provide optimum conveying, mixing and pumping conditions.

In operation, the components to be melt mixed and extruded, for example the binder resin, magnetic component, colorant and optionally charge control additive, enter the extrusion apparatus from the first upstream supply port 8 and the second downstream port 9 as described herein. The binder resin, usually in the form of solid pellets, chips, granules, or other forms is fed together with the colorant and optionally charge control additive to the first upstream supply port 8 by starve feeding, gravity feeding, volumetric feeding, loss-in-weight feeding, or other known feeding methods. In one embodiment, the binder resin, colorant and optionally charge control additive are preblended prior to being added to the extruder, and the preblend is added through the first upstream supply port 8. In another embodiment, the binder resin, colorant and optionally charge control additive are separately fed to the extruder through the first upstream supply port 8. The magnetic component, usually in the form of a powder, is fed to the second downstream supply port 9 by starve feeding, gravity feeding, volumetric feeding, loss-in-weight feeding, or other known feeding methods to minimize undue screw abrasion by the magnetic component in the screw channel before the polymer is melted. This does not preclude other methods of adding the binder resin, magnetic component, colorant and optionally charge control additive to the extruder. After the binder resin is fed to the screw extruder channel 7, the resin is melted. The magnetic component, colorant and optionally charge control additive are distributed and dispersed in the molten resin due to the high shear developed in the screw extruder channel 7. Heating from 40° C. to about 300° C., and preferably from the melting temperature of the binder resin to about 150° C. above the melting temperature of the binder resin takes place from two sources (1) external barrel heating from heaters 10, and (2) internal heating from viscous dissipation within the polymer melt itself. The temperature of the polymer melt in screw extruder channel 7 is controlled through thermocouple 11 to optimize the degree of mixing of the magnetic component, colorant and optionally charge control additive in the polymer melt. At the end of the screw extruder channel 7, the molten mixture is pumped through die 12, such as for example a strand die, to pelletizer 13 such as, for example, a water bath pelletizer, underwater granulator, mist water granulator, etc.

With further reference to FIG. 1, the rotational speed of the screw 6 can be of any suitable value. Generally, the rotational speed of screw 6 is from about 50 to about 500 revolutions per minute. The barrel temperature which is controlled by thermocouples 11 and generated in part by heaters 10, is from about 40° C. to about 300° C. More specifically, the barrel temperature is in the range of from the melting temperature of the binder resin to about 150° C. above the melting temperature of the binder resin. The die or head pressure generator 12 generates pressure of from about 20 to about 2,000 pounds per square inch. In one embodiment, the screw is allowed to rotate at about 100 revolutions per minute, the temperature along barrel 5 is maintained at about 200° C., and the die pressure is about 1,000 pounds per square inch.

With the process of the present invention, pelletizing is preferably accomplished in a pelletizer such as, for example, a water bath pelletizer, underwater granulator, mist water granulator and the like. A suitable water bath pelletizer is the pelletizing system available from Berlyn Corporation, Worcester, Mass., U.S.A. which consists of a water cooling tank, air stripper and rotating blade pelletizer. The polymer melt strand exiting from the extruder is solidified in the water cooling tank to a temperature below the melting temperature of the polymer, preferably in the range from about 25° C. to about 95° C. The strand subsequently passes through the air stripper to remove surface water clinging to the strand. The strand is then chopped into pellets having a size in the range of from about 1 to about 10 millimeters in diameter.

Grinding may be accomplished in one or more particle size reduction devices such as a mechanical impact mill and a fluid energy mill. Stress is applied by transferring kinetic energy by machine-particle contact with respect to mechanical impact mills, or particle-particle contact in fluid energy mills. Examples of mechanical impact mills which utilize high speed beaters to impact the material to apply stress, include impact crushers, hammer mills, pin disc mills, and turbine mills. A suitable mechanical impact mill is the Fitzmill available from Fitzpatrick Company, Elmhurst, Ill., U.S.A., such as the Model J Fitzmill. In fluid energy mills, the particles are accelerated by the surrounding medium and impact against each other or a target. Examples of fluid energy mills include spiral jet mills and fluidized bed jet mills; a particularly suitable fluid energy mill for the purposes of the present invention is the micronizer available from Sturtevant Mill Company, Boston, Mass., U.S.A. Of particular interest for the purposes of the present invention is the 8 inch Sturtevant micronizer.

Although the particle size range obtainable from various types of grinding devices overlaps somewhat, it is general practice to employ a mechanical impact device such as a Fitzmill to produce particles of the order about 100 microns in size, and to use a fluid energy mill, such as a micronizer, to produce particles of the order of about 10 microns in size. To generate final particles with volume average diameter in the range of from about 25 to about 100 microns, and preferably from about 30 to about 60 microns, the operational window of either the Fitzmill or the micronizer can be extended. For carrier particles significantly smaller in size than 100 microns, it is important to increase the energy input to the particles by grinding for a longer period of time and by reducing the grinding screen mesh size. This is especially relevant for particles containing high amounts of carbon black for conductivity, that is, amounts in the range of from about 10 to about 20 percent by weight of carrier particles, due to the reinforcing nature of the carbon black. Increasing the energy input and/or reducing the Fitzmill screen size has the tendency, however, to cause the particles to heat up and fuse, and to cause premature breakage of the grinding screen. Therefore, the particle size objectives of the present invention cannot, it is believed, be effectively achieved by use of a Fitzmill exclusively. The Fitzmill can be utilized to obtain particles with an intermediate particle size range from about 100 to about 500 microns. These particles are then further ground in a fluid energy mill such as a micronizer. The micronizer, however, operates most efficiently, that is, it produces particles with the narrowest particle size distribution when particles with average particle size in the range of about 5 to about 20 microns are desired. To produce particles in the size range of from about 20 to about 100 microns, there is increased or decreased the feed rate to the micronizer, and to operate at lower than conventional air pressures. Although larger particles are produced, the resulting particle size distributions are usually very wide. It is, therefore important to classify the resulting product.

Particles with narrow size distributions can be generated with various classifying devices. Classification can be achieved through the use of screening devices or air classifiers. Examples of screening devices include Sweco Turboscreens and Alpine Air Jet sieves. A particularly suitable screening device for the processes of the present invention is the Alpine Air Jet sieve (Alpine Model A200LS Air Jet sieve) available from Alpine AG, Augsburg, Germany. In air classifiers, principles of air drag and particle inertia are used to reduce the particle size distribution. Examples of air classifiers are the Donaldson classifier and the Elbow Jet; a particularly suitable screening device for the purposes of the present invention is the Donaldson classifier (Model A12 Acucut air classifier) available from the Donaldson Company, Minneapolis, Minn., U.S.A.

Figure 2:
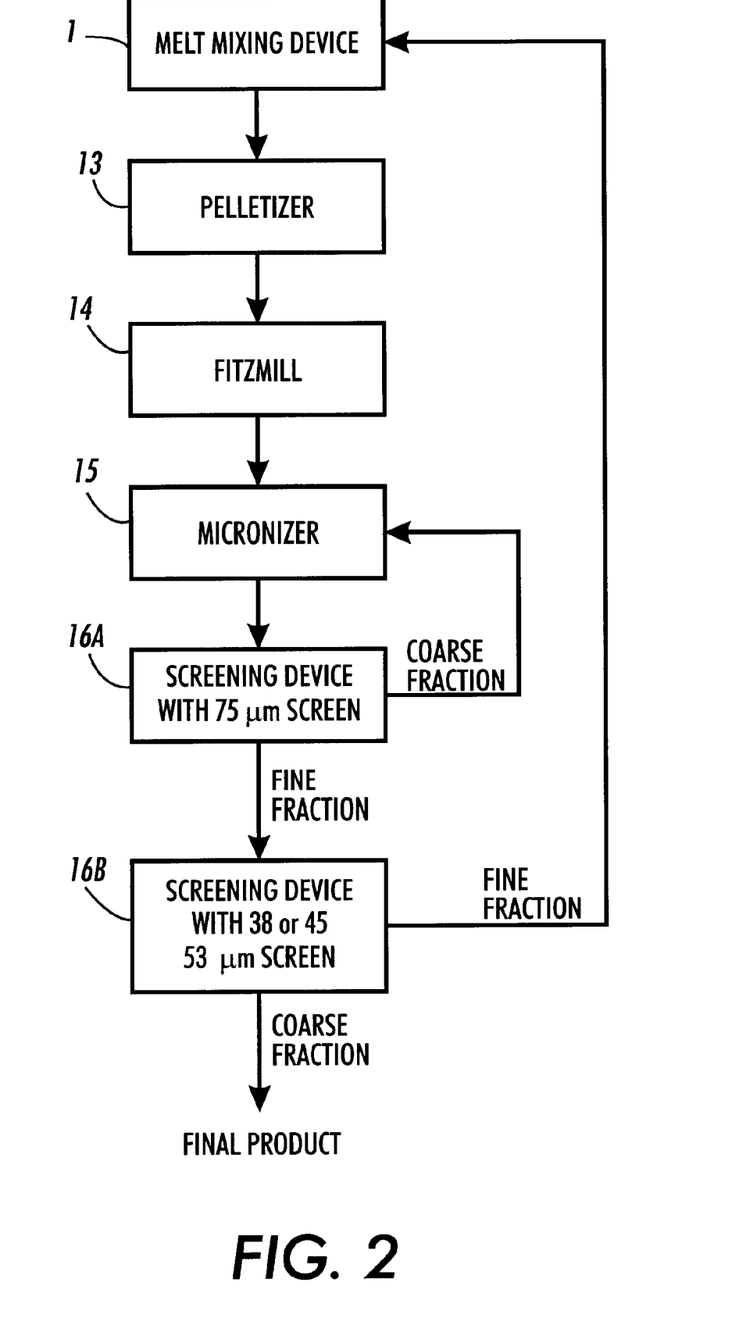
FIG. 2 is a block diagram illustrating processes for generating producing microsynthetic carrier particles with volume average diameters in the size range of from about 40 to about 60 microns.
Figure 3:
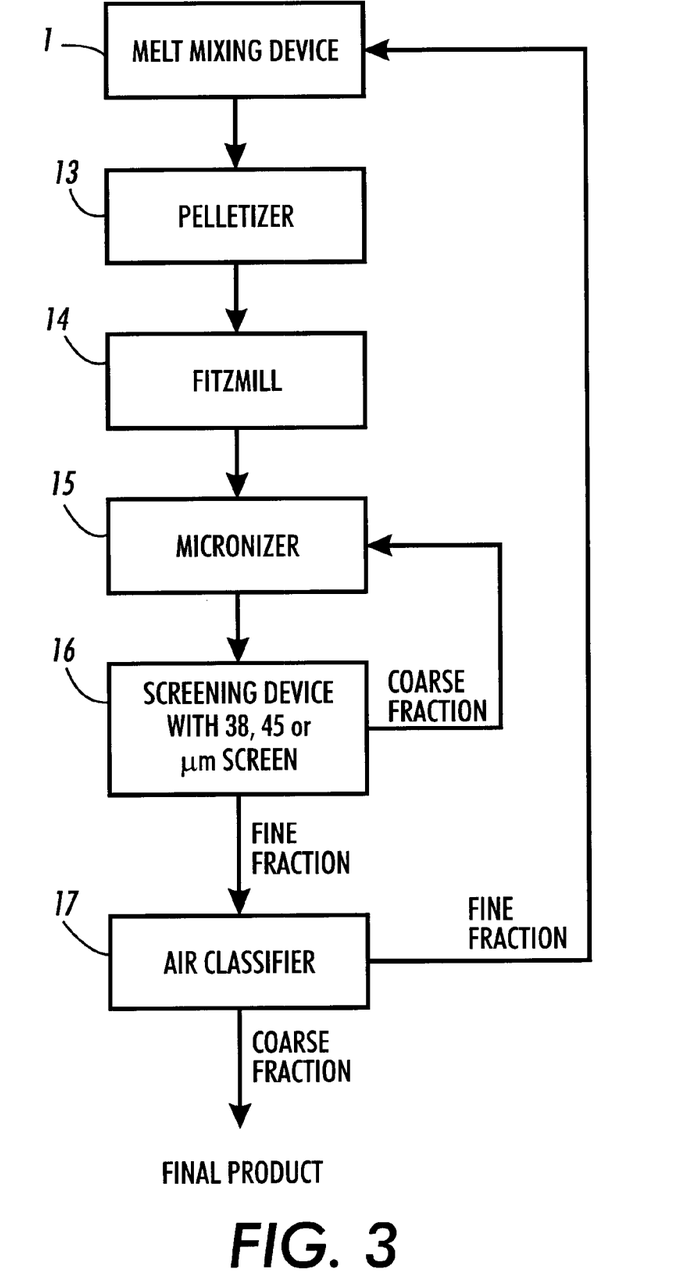
FIG. 3 is a block diagram illustrating processes for generating microsynthetic carrier particles with volume average diameters in the size range of from about 25 to about 45 microns.

A sequence of typical grinding and classification process is illustrated in FIGS. 2 and 3.

In FIG. 2, there is illustrated a process for producing microsynthetic carrier particles having volume average diameters in the range of from about 40 to about 60 microns in a melt mixing device 1, pelletizer 13, Fitzmill 14, micronizer 15, and screening device 16. A process for producing particles having volume average diameters in the range of from about 25 to about 45 microns is illustrated in FIG. 3 showing a melt mixing device 1, pelletizer 13, Fitzmill 14, micronizer 15, screening device 16, and air classifier 17.

In operation, to generate microsynthetic carrier particles with volume average diameters in the range of from about 40 to about 100 microns, and preferably in the range of from about 40 to about 60 microns, the extrudate melt from the melt mixing device, such as an extruder 1, is pelletized in pelletizer 13 and ground to an intermediate particle size in the range of from about 100 to about 500 microns in Fitzmill 14. The fitzmilled particles are then fed to micronizer 15 to further reduce the particle size. The micronizer process variables including feed rate and air pressure are selected to minimize the amount of materials ground to less than 40 microns. The jetted particles are then screened through a 75 micron sieve in screening device 16a. The coarse fraction from the 75 micron screen, that is, particles that do not pass through the 75 micron sieve, may be refed to micronizer 15. The fines fraction from the 75 micron screen, that is, particles that pass through the 75 micron sieve, are next screened through a 38, 45 or 53 micron sieve in screening device 16b. The fines fraction from the 38, 45 or 53 micron sieve may be refed to melt mixing device 1. The coarse fraction from the 38, 45 or 53 micron sieve is considered the final classified synthetic carrier product and this product possesses a volume average diameter in the range of from about 40 to about 60 microns as measured with a Coulter Counter.

To generate microsynthetic carrier particles with, for example, volume average diameters in the range of from about 25 to about 50 microns and preferably in the range of from about 30 to about 45 microns, the extrudate melt from the melt mixing device, such as an extruder 1, is preferably pelletized in pelletizer 13 and ground to an intermediate particle size in the range of from about 100 to about 500 microns in Fitzmill 14. The fitzmilled particles are then fed to micronizer 15 to further reduce the particle size. The micronizer process variables including feed rate and air pressure are selected to minimize the amount of materials ground to less than about 25 microns. The jetted particles are then screened through a 38 or 45 micron sieve in screening device 16. The coarse fraction from the 38 or 45 micron screen, that is, particles that do not pass through the 75 micron sieve, may be refed to micronizer 15. The fines fraction from the 38 or 45 micron screen, that is, particles that pass through the 38 or 45 micron sieve, are fed to air classifier 17. The air classifier process variables including feed rate, rotor speed and air pressure are selected to optimize the amount of fines removed. The fines fraction from air classifier 17 may be refed to melt mixing device 1. Additional passes, ranging from about one to about six, of the coarse fraction may be necessary depending on the desired particle size and particle size distribution. The coarse fraction from the final pass through air classifier 17 is the final classified synthetic carrier product having volume average diameter in the range from about 30 to about 45 microns as measured with a Coulter Counter.

With further reference to FIGS. 2 and 3, the rotor speed of Fitzmill 14 can be of any suitable value. Generally, the rotor speed of the Fitzmill is a fixed value, such as for example about 1,750 revolutions per minute in the Model J Fitzmill. However, the rotor speed utilized can be in a range f from about 1,000 to about 3,000 revolutions per minute. The grinding screen utilized in the Fitzmill can be of any suitable mesh size, however, a mesh size smaller than about 850, for example about 300 to about 700, microns is not particularly suitable for the purposes of the present invention due to excessive heat buildup in the fitzmilled particles and premature breakage of the screen. The feed rate and air pressure in micronizer 15 can be of any suitable value. For the 8 inch Sturtevant micronizer, the feed rate is in the range from about 3 to about 8 pounds per hour, and preferably from about 4.5 to about 6 pounds per hour. The air pressure is, for example, in the range of from about 40 to about 80 pounds per square inch, and preferably from about 50 to about 70 pounds per square inch. Within these ranges of feed rate and air pressure, there is a very narrow window of optimal values of feed rate and air pressure that greatly depends on the composition of the carrier particles. Furthermore, the feed rate in the micronizer is dependent on the micronizer size. For micronizers other than the 8 inch model, known scale factors can be utilized to determine the suitable feed rate. The rotor speed in air classifier 17 can be of any suitable value provided that the objectives of the present invention are achieved. For the Model A12 Acucut Donaldson air classifier, the rotor speed is in the range of from about 700 to about 1,500 revolutions per minute, and preferably from about 750 to about 1,000 revolutions per minute. In one embodiment for producing microsynthetic carrier particles having average sizes in the range of from about 40 to about 100 microns, and preferably in the range of from about 40 to about 60 microns, the rotor speed of Fitzmill 14 is maintained at about 1,750 revolutions per minute utilizing a 850 micron screen, the feed rate and air pressure in micronizer 15 is about 5.0 pounds per hour and 65 pounds per square inch, respectively, a 75 micron screen sieve is utilized in screening device 16a and a 38 micron screen sieve is utilized in screening device 16b. In another embodiment for microsynthetic carrier particles having volume average diameters in the range of from about 25 to about 50 microns, and preferably from about 30 to about 45 microns, the rotor speed of Fitzmill 14 is maintained at about 1,750 revolutions per minute utilizing a 850 micron screen, the feed rate and air pressure in micronizer 15 is about 5.0 pounds per hour and 65 pounds per square inch, respectively, a 38 micron screen sieve is utilized in screening device 16 and the rotor speed in air classifier 17 is maintained at about 1,000 revolutions per minute.

Examples of polymers or copolymers selected for the carrier binder resin in an amount of, for example, from about 10 to about 50 percent, and preferably from about 15 to about 30 percent by weight of carrier include polyamides, epoxies, polyurethanes, silicone polymers, diolefins, vinyl resins, styrene acrylates, styrene methacrylates, styrene butadienes, polyesters such as the polymeric esterification products of a dicarboxylic acid and a diol comprising a diphenol, crosslinked polyesters, and the like. Specific vinyl monomers include styrene, p-chlorostyrene, vinyl naphthalene, unsaturated monoolefins such as ethylene, propylene, butylene, and isobutylene; vinyl halides such as vinyl chloride, vinyl bromide, and vinyl fluoride; vinyl esters such as vinyl acetate, vinyl propionate, vinyl benzoate and vinyl butyrate; vinyl ethers, inclusive of vinyl methyl ether, vinyl isobutyl ether and vinyl ethyl ether; vinyl ketones inclusive of vinyl methyl ketone, vinyl hexyl ketone and methyl isopropenyl ketone; monocarboxylic acids and their derivatives such as acrylic acid, methyl acrylate, ethyl acrylate, n-butyl acrylate, isobutyl acrylate, dodecyl acrylate, n-octyl acrylate, 2-chloroethyl acrylate, phenyl acrylate, methylalphachloracrylate, methacrylic acids, methyl methacrylate, ethyl methacrylate, butyl methacrylate, octyl methacrylate, acrylonitrile, methacrylonitrile, acrylamide and trifluoroethyl methacrylate; dicarboxylic acids having a double bond and their derivatives such as maleic acid, monobutyl maleate, and dibutyl maleate; unsaturated monoolefins such as ethylene, propylene, butylene and isobutylene; vinylidene halides such as vinylidene chloride and vinylidene chlorofluoride; N-vinyl compounds such as N-vinyl indole and N-vinyl pyrrolidene; fluorinated monomers such as pentafluoro styrene, allyl pentafluorobenzene and the like, and mixtures thereof.

Further examples of polymers or copolymers selected for the binder resin in an amount of, for example, from about 10 to about 50 percent, and preferably from about 15 to about 30 percent by weight of carrier include crosslinked polymers with a degree or an amount of crosslinking in the range from about 1 to about 50 percent, and preferably from about 5 to about 40 percent.

Various suitable magnetic components, and preferably hard magnetic powders can be selected in an amount of, for example, from about 50 to about 85 percent, and preferably from about 60 to about 75 percent by weight of carrier. Characteristic properties of importance include those that will enable the toner particles to acquire a positive or a negative charge; and carrier that will permit desirable flow properties in the developer reservoir present in the xerographic imaging apparatus. Also of value with regard to the carrier properties are, for example, desirable aging characteristics. Examples of hard magnetic powders that can be selected include hard magnetic ferrites, and gamma ferric oxide, and mixtures thereof. Preferred hard magnetic powders include ferrites containing iron as the major metallic component with a volume average diameter less than 5 microns, and preferably less than 2 microns as measured by a Coulter Counter. Preferred ferrites also include barium ferrites, strontium ferrites, and lead ferrites.

Examples of colorants present in the amounts as illustrated herein, such as from about 1 to about 40 percent, and preferably from about 4 to about 20 percent by weight of carrier, are selected from the group consisting of carbon blacks, metals, metal oxides, and mixtures thereof, and include for example, conductive carbon blacks such as acetylene black, available from Chevron Chemical, VULCAN XC72R®, BLACK PEARLS L®, available from Cabot Corporation, KEYTJEN BLACK EC600JD®, available from AK20, CONDUCTEX SC ULTRA®, available from Columbian Chemicals, metal oxides such as iron oxides, TiO, $SnO_2$ and metal powders such as iron powder. The primary purpose of the colorant is to reinforce the carrier in the presence of high concentrations of magnetic component, present in amounts from about 50 to about 85 percent by weight of carrier, and to increase the conductivity of the carrier. For conductive carrier, the preferred amount of colorant, for example conductive carbon black, is in the range of from about 10 to about 20 percent by weight of carrier particle.

Also, the carrier can have incorporated therein various known charge enhancing additives, such as quaternary ammonium salts, and more specifically, distearyl dimethyl ammonium methyl sulfate (DDAMS), bis[1-[(3,5- disubstituted-2-hydroxy phenyl)azo]-3-(mono-substituted)-2-naphthalenolato(2-)] chromate(1-), ammonium sodium and hydrogen (TRH), cetyl pyridinium chloride (CPC), FANAL PINK D4830®, and the like, including those as specifically illustrated herein, and other effective known charge agents or additives. The charge additives are selected in various effective amounts, such as from about 0.05 to about 15, and from about 0.1 to about 3 weight percent, based on the sum of the weights of all binder resin, magnetic component, colorant, and charge additive components.

The process of the present invention enables the fabrication of carriers, especially microsynthetic carriers with wide ranges of triboelectric charging values, varied selected conductivity, and small carrier size, for example from about 25 to about 100 microns, and preferably from about 30 to about 60 microns in volume average diameter as determined by a Coulter Counter. Also, there results, in accordance with aspects of the present invention, carrier particles of relatively constant conductivities from about $10^{-17}$ mho/cm to about $10^{-4}$ mho/cm, and preferably from about $10^{-15}$ mho/cm to about $10^{-6}$ mho/cm at, for example, a 10 volt impact across a 0.1 inch gap containing carrier beads held in place by a magnet; and wherein the carrier particles are of a triboelectric charging value of from about −80 to about 80 microcoulombs per gram, and preferably from about −60 to about 60 microcoulombs per gram as determined by a Tilt-A-Whirl tribo measurement device, and magnetic coercivities of from about 300 gauss to about 6,000 gauss, and preferably from about 1,000 gauss to about 3,000 gauss, and induced magnetic moments, that is with hard magnetic cores of from about 10 EMU/g to about 100 EMU/g, and preferably from about 20 EMU/g to about 60 EMU/g, in an applied magnetic field of 1,000 gauss as determined by a vibrating sample magnetometer.

Illustrative examples of toners which when admixed with the carrier generates developer compositions, include thermoplastics, such as styrene based resins, styrene acrylates, styrene methacrylates, styrene butadienes, polyamides, epoxies, polyurethanes, diolefins, vinyl resins, polyesters, such as those obtained by the polymeric esterification products of a dicarboxylic acid and a diol comprising a diphenol. Specific vinyl monomers that can be selected are styrene, p-chlorostyrene vinyl naphthalene, unsaturated mono-olefins such as ethylene, propylene, butylene and isobutylene; vinyl halides such as vinyl chloride, vinyl bromide, vinyl fluoride, vinyl acetate, vinyl propionate, vinyl benzoate, and vinyl butyrate; vinyl esters like the esters of monocarboxylic acids including methyl acrylate, ethyl acrylate, n-butylacrylate, isobutyl acrylate, dodecyl acrylate, n-octyl acrylate, 2-chloroethyl acrylate, phenyl acrylate, methylalphachloracrylate, methyl methacrylate, ethyl methacrylate, and butyl methacrylate; acrylonitrile, methacrylonitrile, acrylamide, vinyl ethers, inclusive of vinyl methyl ether, vinyl isobutyl ether, and vinyl ethyl ether; vinyl, ketones inclusive of vinyl methyl ketone, vinyl hexyl ketone and methyl isopropenyl ketone; vinylidene halides such as vinylidene chloride, and vinylidene chlorofluoride; N-vinyl indole, N-vinyl pyrrolidene; styrene butadiene copolymers; mixtures thereof; and other similar known resins.

As one toner resin, there can be selected the esterification products of a dicarboxylic acid and a diol comprising a diphenol, reference U.S. Pat. No. 3,590,000, the disclosure of which is totally incorporated herein by reference. Other specific toner resins include styrene/methacrylate copolymers; styrene/butadiene copolymers; polyester resins obtained from the reaction of bisphenol A and propylene oxide; and branched polyester resins resulting from the reaction of dimethyl terephthalate, 1,3-butanediol, 1,2-propanediol and pentaerythritol. Also, the crosslinked and reactive extruded polyesters of U.S. Pat. No. 5,227,460, the disclosure of which is totally incorporated herein by reference, may be selected as the toner resin.

Generally, from about 1 part to about 5 parts by weight of toner particles are mixed with from about 10 to about 300 parts by weight of the synthetic carrier particles.

Numerous well known suitable colorants, such as pigments dyes, or mixtures thereof, and preferably pigments can be selected as the colorant for the toner particles including, for example, carbon black, nigrosine dye, lamp black, iron oxides, magnetites, and mixtures thereof. The colorant, which is preferably carbon black, should be present in a sufficient amount to render the toner composition highly colored. Thus, the colorant is present in amounts of, for example, from about 1 percent by weight to about 20, and preferably from about 3 to about 12 percent by weight, based on the total weight of the toner components, however, lesser or greater amounts of pigment may be selected. Colorants include dyes, pigments, mixtures thereof, mixtures of dyes, mixtures of pigments, and the like.

When the colorant particles are comprised of magnetites, which are a mixture of iron oxides ($FeO.Fe_2O_3$), including those commercially available as MAPICO BLACK®, they are present in the toner composition in an amount of from about 10 percent by weight to about 70 percent by weight, and preferably in an amount of from about 20 percent by weight to about 50 percent by weight.

The resin particles are present in a sufficient, but effective amount, thus when 10 percent by weight of pigment, or colorant, such as carbon black like REGAL 330®, is contained therein, about 90 percent by weight of binder material is selected. Generally, the toner composition is comprised of from about 85 percent to about 97 percent by weight of toner resin particles, and from about 3 percent by weight to about 15 percent by weight of colorant particles such as carbon black.

Also, there may be selected colored toner compositions is comprised of toner resin particles, carrier particles and colorants, such as pigments, dyes, and mixtures thereof, and preferably magenta, cyan and/or yellow particles, and mixtures thereof. More specifically, illustrative examples of magentas that may be selected include 1,9-dimethyl-substituted quinacridone and anthraquinone dye identified in the Color Index as CI 60720, CI Dispersed Red 15, a diazo dye identified in the Color Index as CI 26050, CI Solvent Red 19, and the like. Examples of cyans that may be used include copper tetra–4-(octadecyl sulfonamido) phthalocyanine, X-copper phthalocyanine pigment listed in the Color Index as CI 74160, CI Pigment Blue, and Anthrathrene Blue, identified in the Color Index as CI 69810, Special Blue X-2137, and the like; while illustrative examples of yellows that may be selected are diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33, 2,5-dimethoxy–4-sulfonanilide phenylazo–4'-chloro–2,5-dimethoxy acetoacetanilide, permanent yellow FGL, and the like. Other known suitable colorants, such as reds, blues, browns, greens, oranges, food dyes, and the like can be selected. These colorants, especially pigments are generally present in the toner composition in an amount of from about 1 weight percent to about 15, and for example, from about 2 to about 12 weight percent based on the weight of the toner components of binder and pigment.

For further enhancing the charging characteristics of the developer compositions described herein, and as optional components, there can be incorporated therein with respect to the toner charge enhancing additives inclusive of alkyl pyridinium halides, reference U.S. Pat. No. 4,298,672, the disclosure of which is totally incorporated herein by reference; organic sulfate or sulfonate compositions, reference U.S. Pat. No. 4,338,390, the disclosure of which is totally incorporated herein by reference; distearyl dimethyl ammonium sulfate; U.S. Pat. No. 4,560,635, the disclosure of which is totally incorporated herein by reference; and other similar known charge enhancing additives, such as metal complexes, BONTRON E-84™, BONTRON E-88™, and the like. These additives are usually selected in an amount of from about 0.1 percent by weight to about 20, and for example, from about 3 to about 12 percent by weight. These charge additives can also be dispersed in the carrier polymer coating as indicated herein.

The toner composition of the present invention can be prepared by a number of known methods including melt blending the toner resin particles, and colorants of the present invention followed by mechanical attrition, in situ emulsion/aggregation/coalescence, reference U.S. Pat. Nos. 5,370,963; 5,344,738; 5,403,693; 5,418,108; 5,364,729; 5,405,728, the disclosures of which are incorporated herein by reference, and the like. Other methods include those well known in the art such as spray drying, melt dispersion, dispersion polymerization and suspension polymerization. In one dispersion polymerization method, a solvent dispersion of the resin particles and the pigment particles are spray dried under controlled conditions to result in the desired product. Toner particles sizes and shapes are known and include for example a toner size of from about 2 to about 25, and preferably from about 6 to about 14 microns in volume average diameter as determined by a Coulter Counter; shapes of irregular, round, spherical, and the like may be selected.

The toner and developer compositions may be selected for use in electrostatographic imaging processes containing therein conventional photoreceptors, including inorganic and organic photoreceptor imaging members. Examples of imaging members are selenium, selenium alloys, and selenium or selenium alloys containing therein additives or dopants such as halogens. Furthermore, there may be selected organic photoreceptors, illustrative examples of which include layered photoresponsive devices comprised of transport layers and photogenerating layers, reference U.S. Pat. Nos. 4,265,990, 4,585,884, 4,584,253, and 4,563,408, the disclosure of each patent being totally incorporated herein by reference, and other similar layered photoresponsive devices. Examples of generating layers are trigonal selenium, metal phthalocyanines, metal free phthalocyanines, titanyl phthalocyanines, hydroxygallium phthalocyanines, and vanadyl phthalocyanines. As charge transport molecules there can be selected the aryl diamines disclosed in the aforementioned patents, such as the '990 patent. These layered members are conventionally charged negatively thus requiring a positively charged toner.

Images, especially colored images obtained with this developer composition possess, for example, acceptable solids, excellent halftones, and desirable line resolution with acceptable or substantially no background deposits excellent chroma, superior color intensity, constant color chroma and intensity over extended time periods, such as 1,000,000 imaging cycles, and the like.

The following Examples are being supplied to further define the present invention, it being noted that these Examples are intended to illustrate and not limit the scope of the present invention. Parts and percentages are by weight unless otherwise indicated.

EXAMPLE I

There are prepared microsynthetic carrier particles according to the following procedure. 73 Parts by weight of styrene n-butyl methacrylate copolymer and 27 parts by weight of VULCAN XC72R® carbon black are blended in a rotary tumble blender for 30 minutes. The resulting mixture is then fed into a Werner & Pfleiderer twin screw extruder, with a screw diameter of 30.7 millimeters and a length-to-diameter ratio of 38.1, through the upstream supply port at about 4.4 pounds per hour using a loss-in-weight twin screw feeder. Once a steady state flow of this mixture is exiting from the extruder, MAPICO BLACK® magnetite is fed to the extruder through a downstream supply port at about 5.6 pounds per hour using a volumetric twin screw feeder. The melt mixing is accomplished at the following process conditions: barrel temperature of 140° C., die head temperature of 140° C., and screw speed of 200 revolutions per minute. The extrudate melt, upon exiting from the strand die, is cooled in a water bath, dried in an air stripper and pelletized in a rotating blade pelletizer. The extruded pellets, about 4 millimeters in diameter, comprise about 38 percent by weight of styrene n-butyl methacrylate copolymer, about 49 percent by weight of magnetite, and about 13 percent of carbon black as measured by thermal gravimetric analysis, and which extruded pellets are utilized in Comparative Example II, Comparative Example III and Example V.

COMPARATIVE EXAMPLE II

A 2 kilogram sample of the extruded product of Example I is ground in a Model J Fitzmill utilizing a 850 micron screen and running with a rotor speed of about 1,750 revolutions per minute. Thereafter, substantially none of the resulting ground material passes through a 90 micron screen in the Alpine Model A200LS air jet sieve. Therefore, the ground particles are of a size greater than about 90 microns.

COMPARATIVE EXAMPLE III

A 5 kilogram sample of the extruded product of Example I is ground in a Model J Fitzmill utilizing a 850 micron screen and running with a rotor speed of about 1,750 revolutions per minute. Five 500 gram samples of this fitzmilled product are jetted in an 8 inch Sturtevant micronizer at the feed rates of fitzmilled material and air pressures given in Table I. The jetted material in each situation is screened through a 75 micron screen utilizing an Alpine Model A200LS air jet sieve to remove coarse particles greater than 75 microns in size and the fines fraction less than 75 microns in size is retained as product. The particle size distribution of each product is measured with a Coulter Counter, and the product yield which is the weight fraction of product between 25 and 75 microns determined from the particle size distribution is provided in Table I.

TABLE I

Jetting Experiments of Comparative Example III

| Feed Rate (pounds/hour) | Air Pressure (pounds/in²) | Product Yield between 25 and 75 microns (%) |
|---|---|---|
| 4.1 | 105 | 1 |
| 5.9 | 105 | 3 |
| 7.7 | 105 | 3 |
| 4.7 | 90 | 7 |
| 4.7 | 70 | 11 |

As indicated in Table I, the yield of product between 25 and 75 microns is very low for each run, that is, less than about 15 percent. In each situation, substantially the entire product is ground to less than 25 microns.

EXAMPLE IV

Four 500 gram samples of the fitzmilled product of Comparative Example II are jetted in an 8 inch Sturtevant micronizer according to a 2×2 full factorial matrix of feed rates of fitzmilled material and air pressures as denoted in Table II. The jetted material in each situation is screened through a 75 micron screen to remove coarse particles and the fines fraction is retained as product. The particle size distribution of each product (carrier) is measured with a Coulter Counter, and the product yield which is the weight fraction of product between 25 and 75 microns calculated from the particle size distribution is given in Table II.

TABLE II

Jetting Experiments of Example IV

| Feed Rate (pounds/hour) | Air Pressure (pounds/in²) | Product Yield between 25 and 75 microns (%) |
|---|---|---|
| 5.3 | 75 | 38 |
| 5.3 | 65 | 48 |
| 5.0 | 75 | 18 |
| 5.0 | 65 | 60 |

As illustrated in Table II, there is a window of operation that provides suitable yield of jetted material with particle sizes in the range of from about 25 to about 75 microns. In the present Example, the highest yield of product is obtained by utilizing a feed rate of fitzmilled material of 5.0 pounds per hour and an air pressure of 65 pounds per square inch.

EXAMPLE V

A 2 kilogram sample of the extruded product of Example I is ground in a Model J Fitzmill utilizing a 850 micron screen and running with a rotor speed of about 1,750 revolutions per minute. A 1,000 gram sample of this fitzmilled product is jetted in an 8 inch Sturtevant micronizer at a feed rate of about 5.0 pounds per hour and air pressure of 65 pounds per square inch. The jetted material is then screened first through a 75 micron screen and then through a 38 micron screen utilizing an Alpine Model A200LS air jet sieve. The course fraction from the 38 micron screen with a particle size greater than about 38 microns has a weight of about 460 grams and is retained as Product A; the fines fraction having particle size less than 38 microns has a weight of 480 grams and is retained as intermediate Product B for use in Example VI. Product A is microsynthetic carrier comprised of about 38 percent by weight styrene n-butyl methacrylate copolymer, 49 percent by weight of magnetite, and about 13 percent of carbon black as measured by thermal gravimetric analysis, and has a volume average diameter of about 44 microns and a geometric size distribution (GSD) of about 1.26 as measured with a Coulter Counter.

Thereafter, the above prepared carrier is permanently magnetized at 8,500 gauss, and a developer mixture is generated by mixing 10 grams of magnetized carrier and 1.6 grams of toner. The toner is comprised of 16.12 percent by weight of the extruded partially crosslinked propoxylated bisphenol A fumarate polyester containing about 30 percent gel of U.S. Pat. No. 5,227,460, the disclosure of which is totally incorporated herein by reference, 80.58 percent by weight of a linear propoxylated bisphenol A fumarate polyester and 3.3 percent by weight of PIGMENT BLUE 15:3 colorant, available from Sun Chemicals Corporation, and as surface additives 0.6 percent by weight of TS530 AEROSIL® fumed silica, available from Degussa Chemicals Corporation, 0.9 percent by weight of TD3103 treated titania available from Tayca Corporation and 0.3 percent by weight of zinc stearate, available from Ferro Corporation.

Thereafter, the triboelectric charge on the carrier is determined by the Tilt-A-Whirl process, and is measured as about 11 microcoulombs/gram. Further, the conductivity of each of the carriers as determined by forming a 0.1 inch long magnetic brush of the carrier particles and measuring the conductivity by imposing a 10 volt potential across the brush, is about $5 \times 10^{-8}$ mho/cm. Therefore, the carrier particles are conductive. Still further, the induced magnetic moment of the carrier particles is about 32 EMU/g in an applied field of about 1,000 gauss, and the coercivity is about 120 gauss when magnetically saturated as determined in a vibrating sample magnetometer. Therefore, the carrier particles are soft magnetic carrier particles and not hard magnetic carrier particles.

In the Examples, the triboelectric charging values, conductivities and magnetic properties are obtained in accordance with the aforementioned procedures.

EXAMPLE VI

Intermediate Product B of Example V which is the fines fraction of the screened carrier material less than 38 microns in size is classified twice in a Donaldson Model A12 Acucut air classifier with a rotor speed of 1,000 revolutions per minute. The resultant product with a weight of about 240 grams is a microsynthetic carrier comprised of about 49 percent by weight of magnetite, about 14 percent of carbon black and about 37 percent by weight styrene n-butyl methacrylate copolymer as measured by thermal gravimetric analysis, and has a volume average diameter of about 25 microns and GSD of about 1.37 as measured with a Coulter Counter.

Thereafter, the above prepared carrier is permanently magnetized at 8,500 gauss, and a developer mixture is prepared by mixing 10 grams of magnetized carrier and 1.6 grams of toner of Example V. The triboelectric charge on the carrier is measured as about 9 microcoulombs/g and the conductivity is about $2 \times 10^{-10}$ mho/cm. Therefore, the carrier particles are insulative. Further, the induced magnetic moment of the carrier particles is about 33 EMU/g in an applied field of about 1,000 gauss, and the coercivity is about 120 gauss when magnetically saturated. Therefore, the carrier particles are soft magnetic carrier particles and not hard magnetic carrier particles.

EXAMPLE VII

There are prepared microsynthetic carrier particles according to the following procedure. 63 Parts by weight styrene n-butyl methacrylate copolymer and 37 parts by weight CONDUCTEX SC ULTRA® carbon black are blended in a rotary tumble blender for 30 minutes. The resulting mixture is then fed into a Werner & Pfleiderer twin screw extruder, with a screw diameter of 30.7 millimeters and a length-to-diameter ratio of 38.1, through the upstream supply port at about 4.0 pounds per hour using a loss-in-weight twin screw feeder. Once a steady state flow of this mixture is exiting from the extruder, strontium ferrite powder is fed to the extruder through a downstream supply port at about 6.0 pounds per hour using a volumetric twin screw feeder. The melt mixing is accomplished at the following process conditions: barrel temperature of 150° C., die head temperature of 150° C., and screw speed of 200 revolutions per minute. The extrudate melt, upon exiting from the strand die, is cooled in a water bath and pelletized. A 2 kilogram sample of the extruded pellets is then ground in a Model J Fitzmill utilizing a 850 micron screen, and a 1 kilogram sample of the fitzmilled material is jetted in an 8 inch Sturtevant micronizer at a feed rate of about 5.0 pounds per hour and air pressure of about 60 pounds per square inch. The jetted material is then screened first through a 75 micron screen and then through a 45 micron screen utilizing an Alpine Model A200LS air jet sieve. The course fraction from the 45 micron screen with particle size between 45 and 75 microns has a weight of about 420 grams and is retained as Product C; the fines fraction with particle size less than 45 microns has a weight of about 450 grams and is retained as intermediate Product D for use in Example VIII.

Product C is microsynthetic carrier comprised of about 61 percent by weight of strontium ferrite, about 14 percent of carbon black and about 25 percent by weight styrene n-butyl methacrylate copolymer as measured by thermal gravimetric analysis, and has a volume average diameter of about 54 microns and GSD of about 1.22 as measured with a Coulter Counter. Thereafter, the above prepared carrier is permanently magnetized at 8,500 gauss, and a developer mixture is made up by mixing 10 grams of magnetized carrier and 1.6 grams of toner of Example V. The triboelectric charge on the carrier is measured as about 16 microcoulombs/g and the conductivity is about $2 \times 10^{-9}$ mho/cm. Therefore, the carrier particles are conductive. Further, the induced magnetic moment of the carrier particles is about 21 EMU/g in an applied field of about 1,000 gauss, and the coercivity is about 2,100 gauss when magnetically saturated. Therefore, the carrier particles are hard magnetic carrier particles and not soft magnetic carrier particles.

EXAMPLE VIII

Intermediate Product D of Example VII, which is the fines fraction of the screened carrier material less than 45 microns in size, is classified once in a Donaldson Model A12 Acucut air classifier with a rotor speed of 750 revolutions per minute. The resultant product with a weight of about 260 grams is microsynthetic carrier comprised of about 65 percent by weight of strontium ferrite, about 12 percent of carbon black and about 23 percent by weight styrene n-butyl methacrylate copolymer as measured by thermal gravimetric analysis, and has a volume average diameter of about 33 microns and GSD of about 1.25 as measured with a Coulter Counter.

Thereafter, the above prepared carrier is permanently magnetized at 8,500 gauss, and a developer mixture is made up by mixing 10 grams of magnetized carrier and 1.6 grams of toner of Example V. The triboelectric charge on the carrier is measured as about 15 microcoulombs/gram and the conductivity is about $7 \times 10^{-13}$ mho/cm. Therefore, the carrier particles are insulative. Further, the induced magnetic moment of the carrier particles is about 23 EMU/g in an applied field of about 1,000 gauss, and the coercivity is about 2,120 gauss when magnetically saturated. Therefore, the carrier particles are hard magnetic carrier particles and not soft magnetic carrier particles.

Other embodiments and modifications of the present invention may occur to those of ordinary skill in the art subsequent to a review of the present application and the information presented herein; these embodiments modifications, and equivalents, or substantial equivalents thereof, are also included within the scope of the present invention.

What is claimed is:

1. A process for the preparation of carrier consisting of the melt mixing of a mixture of binder resin, magnetic component, and colorant accomplished by
    (i) first melting said binder resin and colorant, thereby forming a polymer melt;
    (ii) introducing said magnetic component into the polymer melt;
    (iii) providing sufficiently high shear to disperse the colorant, and magnetic component in the polymer melt, pelletizing;
    (iv) cooling the polymer melt;
    (v) griding; and
    (vi) classification; and wherein microsynthetic carrier possesses a size of from about 25 to about 80 microns, and said colorant is present in an amount of at least about 10 percent by weight.

2. A process in accordance with claim 1 wherein said melting is accomplished by heating at a temperature of from about 40° C. to about 300° C., and cooling is from about 25° C. to about 95° C.

3. A process in accordance with claim 1 wherein said melt mixing is accomplished in a batch melt mixing device, in a continuous melt mixing device, or in an extruder.

4. A process in accordance with claim 1 wherein said pelletizing is accomplished in a pelletizer.

5. A process in accordance with claim 1 wherein said pelletizing is accomplished in a rotating blade pelletizer, or in a mechanical impact grinder.

6. A process in accordance with claim 1 wherein said grinding is accomplished in a Fitzmill.

7. A process in accordance with claim 1 wherein said grinding is accomplished in a fluid energy mill, or in a micronizer.

8. A process in accordance with claim 1 wherein said classification is accomplished in a screening device.

9. A process in accordance with claim 1 wherein said classification is accomplished in an air classifier.

10. A process in accordance with claim 1 comprising
    (i) preblending and feeding, or separately feeding, the binder resin and colorant to an continuous melt mixing apparatus at an upstream location;
    (ii) melting the mixture of binder resin and colorant, thereby forming a polymer melt;
    (iii) feeding the magnetic component to said melt mixing apparatus at a downstream location;
    (iv) providing sufficiently high shear to disperse the colorant and magnetic component in the polymer melt by controlling the melt temperature in said melt mixing apparatus;
    (v) pumping the polymer melt through a die;
    (vi) cooling the extrudate;

(vii) pelletizing;

(viii) grinding the pellets to an intermediate volume average diameter in the range of from about 100 to about 500 microns in a mechanical impact mill;

(ix) further grinding the particles to a volume average diameter in the range of from about 20 to about 100 microns in a fluid energy mill; and (x) classifying the particles in a screening device, and in an air classifier; and wherein microsynthetic carrier possesses a size of from about 25 to about 80 microns, and said colorant is present in an amount of at least about 10 percent by weight.

11. A process in accordance with claim 10 further comprising heating said polymer melt to a temperature of from about 40° C. to about 300° C., and controlling the temperature of said polymer melt during melt mixing.

12. A process in accordance with claim 10 wherein said grindings are accomplished in a Fitzmill utilizing a 850 micron screen, and the rotor speed in said Fitzmill is in the range of from about 1,000 to about 3,000 revolutions per minute.

13. A process in accordance with claim 10 wherein said grindings are accomplished in an about 8 inch micronizer, and the feed rate in said micronizer is in the range of from about 3 to about 8 pounds per hour, and the air pressure in said micronizer is in the range of from about 40 to about 80 pounds per square inch.

14. A process in accordance with claim 10 wherein grindings are accomplished in an about 8 inch micronizer, and the feed rate in said micronizer is in the range of from about 4.5 to about 6 pounds per hour, and air pressure in said micronizer is in the range of from about 50 to about 70 pounds per square inch.

15. A process in accordance with claim 10 wherein said classification is accomplished in a screening device to obtain a carrier particle volume average diameter in the range of from about 40 to about 100 microns, and further comprising (i) screening said particles through a 75 micron sieve in said screening device;

(ii) screening the fines fraction resulting from said screened particles (i) through a 38, 45 or 53 micron sieve; and (iii) retaining the coarse fraction of said screened particles with a volume average diameter in the range of from about 38 to about 75 microns, about 45 to about 75 microns, or about 53 to about 75 microns, respectively, as carrier product.

16. A process in accordance with claim 10 wherein said classification is accomplished in a screening device and an air classifier to generate particles with a volume average diameter in the range of from about 25 to about 50 microns, and further comprising (i) screening said particles through a 38 or a 45 micron sieve;

(ii) feeding the fines fraction resulting from (i) to said air classifier, and wherein the rotor speed of said air classifier is in the range of from about 700 to about 1,500 revolutions per minute; and (iii) retaining the coarse fraction of said classified particles with a volume average diameter in the range of from about 25 to about 50 microns as carrier product.

17. A process in accordance with claim 1 wherein said binder resin is a polyamide, an epoxy, a polyurethane, a silicone polymer, a diolefin, a vinyl resin, a styrene acrylate, a styrene methacrylate, a styrene butadiene, or a polyester.

18. A process in accordance with claim 17 wherein said polyester is the polymeric esterification product of a dicarboxylic acid and a diol comprising a diphenol, and wherein specific vinyl monomer is styrene, p-chlorostyrene, vinyl naphthalene, unsaturated monoolefins ethylene, propylene, butylene, or isobutylene; vinyl halides vinyl chloride, vinyl bromide, or vinyl fluoride; vinyl esters vinyl acetate, vinyl propionate, vinyl benzoate or vinyl butyrate; vinyl ethers of vinyl methyl ether, vinyl isobutyl ether or vinyl ethyl ether; vinyl ketones of vinyl methyl ketone, vinyl hexyl ketone or methyl isopropenyl ketone; monocarboxylic acids of acrylic acid, methyl acrylate, ethyl acrylate, n-butyl acrylate, isobutyl acrylate, dodecyl acrylate, n-octyl acrylate, 2-chloroethyl acrylate, phenyl acrylate, methylalphachloracrylate, methacrylic acids, methyl methacrylate, ethyl methacrylate, butyl methacrylate, octyl methacrylate, acrylonitrile, methacrylonitrile, acrylamide or trifluoroethyl methacrylate; dicarboxylic acids with a double bond and their derivatives of maleic acid, monobutyl maleate, dibutyl maleate, unsaturated monoolefins of ethylene, propylene, butylene or isobutylene; vinylidene halides of vinylidene chloride or vinylidene chlorofluoride; N-vinyl compounds of N-vinyl indole or N-vinyl pyrrolidene; fluorinated monomers of pentafluoro styrene, allyl pentafluorobenzene or mixtures thereof, and where the amount of said binder resin is from about 10 to about 50 percent by weight of said carrier.

19. A process in accordance with claim 1 wherein said binder resin is polymethyl methacrylate, polystyrene n-butyl methacrylate copolymer, polymethyl/n-butyl methacrylate copolymer, or mixtures thereof, and where the amount of said binder resin is from about 10 to about 50 percent by weight of said carrier.

20. A process in accordance with claim 1 wherein said magnetic component is selected from the group consisting of metals, metal oxides, and mixtures thereof, and where the amount of said magnetic component is from about 50 to about 85 percent by weight of said carrier.

21. A process in accordance with claim 1 wherein said magnetic component is a hard magnetic component selected from the group consisting of metals, metal oxides, and mixtures thereof, and where the amount of said hard magnetic component is from about 60 to about 75 percent by weight of said carrier.

22. A process in accordance with claim 1 wherein said magnetic component is a ferrite, and where the amount of said ferrite is from about 50 to about 85 percent by weight of said carrier.

23. A process in accordance with claim 1 wherein said magnetic component is strontium ferrite, and where the amount of said strontium ferrite is from about 50 to about 85 percent by weight of said carrier.

24. A process in accordance with claim 1 wherein said colorant is selected from the group consisting of carbon blacks, metals, metal oxides, and mixtures thereof, and where the amount of said colorant is from about 1 to about 40 percent by weight of said carrier.

25. A process in accordance with claim 1 wherein said colorant is carbon black, and where the amount of said carbon black is from about 10 to about 20 percent by weight of said carrier.

26. A process in accordance with claim 1 wherein there is added to the melt a charge control of a quatinary ammonium salt, and where the amount of said quaternary ammonium salt is from about 0.05 to about 15 percent by weight of said carrier.

27. A process in accordance with claim 1 wherein said carriers produced by said process are composite particles comprising binder resin, magnetic component, and colorant, wherein the binder resin is present in an amount of from about 10 percent to about 50 percent by weight of said carrier, wherein the magnetic component is present in an amount of from about 50 percent to about 85 percent by weight of said carrier, wherein the colorant is present in an amount of from about 1 percent to about 40 percent by weight of said carrier, and wherein the melt includes a charge control additive present in an amount of from about 0.05 percent to about 15 percent by weight of said carrier.

28. A process in accordance with claim 1 wherein said carriers produced by said process are composite particles comprising binder resin, magnetic component, and colorant, and wherein the binder resin is present in an amount of from about 15 percent to about 30 percent by weight of said carrier, wherein the magnetic component is present in an amount of from about 60 percent to about 75 percent by weight of said carrier, and wherein the colorant is present in an amount of from about 4 percent to about 20 percent by weight of said carrier.

29. A process in accordance with claim 1 wherein said carrier produced by said process has a volume average diameter of from about 25 to about 500 microns.

30. A process in accordance with claim 1 wherein said carrier produced by said process has a volume average diameter of from about 25 to about 100 microns.

31. A process in accordance with claim 1 wherein said carrier produced by said process has a volume average diameter of from about 30 to about 60 microns.

32. A process in accordance with claim 1 wherein said carrier produced by said process has a triboelectric charge value of from about −80 to about 80 microcoulombs/gram.

33. A process in accordance with claim 1 wherein said carrier produced by said process has a conductivity of from about $10^{-17}$ to about $10^{-4}$ mho/cm.

34. A process in accordance with claim 1 wherein said carrier produced by said process has a triboelectric charge value of from about −60 to about 60 microcoulombs/gram and a conductivity of from about $10^{-15}$ to about $10^{-6}$ mho/cm.

35. A process in accordance with claim 1 wherein said carrier produced by said process has a magnetic coercivity of from about 300 to about 6,000 gauss.

36. A process in accordance with claim 1 wherein said carrier produced by said process has an induced magnetic moment of from about 20 to about 100 EMU/g in an applied field of about 1,000 gauss.

37. A process in accordance with claim 1 wherein said carrier produced by said process has a magnetic coercivity of from about 1,000 to about 3,000 gauss, and an induced magnetic moment of from about 20 to about 60 EMU/g in an applied field of about 1,000 gauss.

38. A process for the preparation of microsynthetic carrier with a high solids content consisting essentially of the melting of a mixture of binder resin, magnetic component, and colorant; subsequently adding said mixture to a melt mixing device; cooling and pelletizing said mixture, and thereafter grinding and classifying said pellets; and wherein said microsynthetic carrier possesses a size of from about 25 to about 80 microns, and said colorant.

39. A process in accordance with claim 38 wherein there is formed, subsequent to said melting of the mixture, a polymer melt comprised of a mixture of binder resin present in an amount of from about 10 to about 50 percent by weight of said mixture, magnetic component present in an amount of from about 50 to about 85 percent by weight of said mixture, colorant present in an amount of from about 1 to about 40 percent by weight of said mixture, wherein said mixing is accomplished at a temperature in the range of from about 40° C. to about 300° C.; wherein said mixture is cooled to from about 25° C. to about 95° C.; wherein said mixture is pelletized in a rotating blade pelletizer to a size in the range of from about 1 to about 10 millimeters; and wherein said grinding and classifying are accomplished in a mechanical impact mill followed by a fluid energy and classifier to reduce the pellets size to a volume average diameter in the range from about 25 to about 100 microns.

40. A process in accordance with claim 38 wherein said polymer melt is comprised of a mixture of binder resin comprising polymethyl methacrylate, polystyrene n-butyl methacrylate copolymer, polymethyl/n-butyl methacrylate copolymer in an amount of from about 15 to about 30 percent by weight of said mixture, strontium ferrite in an amount of from about 60 to about 75 percent by weight of said mixture, carbon black in the amount of from about 10 to about 20 percent by weight of said mixture, wherein said mixing is accomplished in an extruder at a temperature in the range of from the melting temperature of the binder resin to about 150° C. above the melting temperature of the binder resin; wherein said mixture is cooled to from about 25° C. to about 95° C.; wherein said mixture is pelletized in a rotating blade pelletizer to a size of from about 1 to about 10 millimeters; wherein said grinding is accomplished in a Fitzmill utilizing a 850 micron screen and operating with a rotor speed of from about 1,000 to about 3,000 revolutions per minute to obtain a particle volume average diameter in the range of from about 100 to about 500 microns; wherein subsequent grinding is accomplished in an 8 inch micronizer operating at a feed rate in the range of from about 4.5 to about 6 pounds per hour and air pressure in the range of from about 50 to about 70 pounds per square inch to reduce the particle size to a volume average diameter in the range of from about 20 to about 100 microns; and wherein said classifying is accomplished in a screening device utilizing screens with mesh sizes in the range of from about 38 to about 75 microns to obtain microsynthetic carrier with volume average diameter of from about 40 to about 60 microns.

41. A process for the preparation of carrier consisting of in sequence the melt mixing of a mixture of binder resin, magnetic component, and colorant accomplished by (i) first melting said binder resin and colorant, thereby forming a polymer melt;

(ii) introducing said magnetic component into the polymer melt;

(iii) providing sufficiently high shear to disperse the colorant, and magnetic component in the polymer melt, pelletizing;

(iv) cooling the polymer melt;

(v) grinding; and (vi) classification; and wherein there results microsynthetic carrier which possesses a size of from about 25 to about 80 microns, and said colorant is present in an amount of at least about 10 percent by weight.

* * * * *